United States Patent
Ohba

(10) Patent No.: US 9,039,089 B2
(45) Date of Patent: May 26, 2015

(54) LOCK DEVICE OF VEHICLE SEAT

(71) Applicant: FUJI KIKO CO., LTD., Kosai-shi, Shizuoka (JP)

(72) Inventor: Hironori Ohba, Hamamatsu (JP)

(73) Assignee: FUJI KIKO CO., LTD., Kosai-shi (JP)

( * ) Notice: Subject to any disclaimer, the term of this patent is extended or adjusted under 35 U.S.C. 154(b) by 89 days.

(21) Appl. No.: 13/871,137

(22) Filed: Apr. 26, 2013

(65) Prior Publication Data

US 2013/0285430 A1    Oct. 31, 2013

(30) Foreign Application Priority Data

Apr. 27, 2012    (JP) .................... 2012-101977

(51) Int. Cl.
*B60N 2/48*    (2006.01)
*B60N 2/235*   (2006.01)
*B60N 2/015*   (2006.01)
*B60N 2/36*    (2006.01)

(52) U.S. Cl.
CPC .......... *B60N 2/2352* (2013.01); *B60N 2/01583* (2013.01); *B60N 2/366* (2013.01)

(58) Field of Classification Search
CPC ................. B60N 2/305; B60N 2/366
USPC .............. 297/331, 335, 336, 378.13
See application file for complete search history.

(56) References Cited

U.S. PATENT DOCUMENTS

| | | | |
|---|---|---|---|
| 6,733,078 B1 * | 5/2004 | Zelmanov | 297/378.1 |
| 6,820,912 B1 * | 11/2004 | Lavoie | 296/65.03 |
| 7,188,906 B2 * | 3/2007 | Christoffel et al. | 297/378.13 |
| 7,273,254 B2 * | 9/2007 | Fujita et al. | 297/331 |
| 7,338,128 B2 * | 3/2008 | Inoue et al. | 297/378.13 |
| 7,416,254 B2 * | 8/2008 | Jennings | 297/378.12 |
| 7,762,605 B2 * | 7/2010 | Otsuka et al. | 296/65.03 |
| 7,926,858 B2 * | 4/2011 | Otsuka | 292/216 |
| 7,954,898 B2 * | 6/2011 | Van De Geer et al. | 297/378.13 |
| 8,128,135 B2 * | 3/2012 | Maeta et al. | 292/216 |
| 8,282,141 B2 * | 10/2012 | Paing et al. | 292/216 |
| 8,333,530 B2 * | 12/2012 | Omori | 403/330 |
| 8,511,723 B2 * | 8/2013 | Otsuka | 292/216 |
| 8,544,931 B2 * | 10/2013 | Park et al. | 296/65.03 |

(Continued)

FOREIGN PATENT DOCUMENTS

JP    2011-255799 A    12/2011

OTHER PUBLICATIONS

U.S. Appl. No. 13/871,124, filed Apr. 26, 2013, Ohba.

*Primary Examiner* — David R Dunn
*Assistant Examiner* — Alexander Harrison
(74) *Attorney, Agent, or Firm* — Foley & Lardner LLP

(57)    ABSTRACT

A latch plate for a lock device is proposed which comprises a latch plate proper and a film that covers the latch plate proper. The latch plate proper includes upper and lower finger portions between which a striker catching recess is defined. An upper surface of the lower finger portion includes a depressed main portion located near the bottom of the striker catching recess, a raised leading end portion and a stepped portion provided between the depressed main portion and the raised leading end portion. The film covers the latch plate proper except the raised leading end portion. The film covers the depressed main portion of the upper surface in such a manner that an outer surface of the film is flush with the stepped portion. When the film is depressed by the striker, the stepped portion enhances a function is to stop a movement of the striker toward a mouth of the striker catching recess.

9 Claims, 10 Drawing Sheets

(56) References Cited

U.S. PATENT DOCUMENTS

| | | |
|---|---|---|
| 8,590,973 B2 * | 11/2013 | Matsuura et al. ........ 297/378.13 |
| 8,672,385 B2 * | 3/2014 | Matsumoto et al. ....... 296/65.01 |
| 8,708,377 B2 * | 4/2014 | Ishikawa et al. ................ 292/96 |
| 8,708,413 B2 * | 4/2014 | Heeg et al. ............... 297/378.13 |
| 8,720,997 B2 * | 5/2014 | Kalinowski ................... 297/336 |
| 8,727,443 B2 * | 5/2014 | Vedder et al. ............ 297/378.13 |
| 2005/0023877 A1 * | 2/2005 | Vermeulen ............... 297/378.13 |
| 2005/0212338 A1 * | 9/2005 | Muller et al. ................. 297/336 |
| 2007/0170341 A1 * | 7/2007 | Baumchen et al. ......... 248/503.1 |
| 2007/0200410 A1 * | 8/2007 | Inoue et al. ............... 297/378.13 |
| 2010/0052394 A1 * | 3/2010 | Heeg et al. ............... 297/378.13 |
| 2010/0102614 A1 * | 4/2010 | Kreuels et al. ........... 297/378.13 |
| 2010/0117425 A1 * | 5/2010 | Abe et al. ...................... 297/335 |
| 2011/0006576 A1 * | 1/2011 | Muller et al. ............. 297/378.13 |
| 2011/0006577 A1 * | 1/2011 | Muller et al. ............. 297/378.13 |
| 2011/0012415 A1 * | 1/2011 | Muller et al. ............. 297/378.13 |
| 2011/0304160 A1 | 12/2011 | Kamata et al. |
| 2013/0328372 A1 * | 12/2013 | Suzumura et al. ....... 297/378.13 |
| 2014/0070589 A1 * | 3/2014 | Teufel et al. ............. 297/378.13 |

* cited by examiner

LOCK DEVICE OF VEHICLE SEAT

BACKGROUND OF THE INVENTION

1. Field of the Invention

The present invention relates in general to lock devices that lock one member to the other member, and more particularly to the lock devices of a type that locks a seat back or seat cushion of a vehicle seat relative to a body of a vehicle. More specifically, the present invention is concerned with the lock devices of a type that is able to obtain an improved locked condition relative to a striker.

2. Description of Related Art

Hitherto, various lock devices have been proposed and put into a practical use in the field of seats of motor vehicles. Some of them are of a type that can lock a pivotal seat back at a given angular position relative to a seat cushion mounted on a floor of the vehicle.

For providing a seat occupant with an assuredly safety ride on the vehicle, some of the lock devices of the above-mentioned type are equipped with an improvement in assuring a locked condition of the lock device (or lock unit) relative to a fixed striker. Actually, if the lock device fails to exhibit a satisfied locking work to the striker at the time of vehicle collision or the like, the seat back to which the lock unit is mounted would be released from the striker causing the seat occupant to get into unsafe situation.

For eliminating such drawback, Japanese Laid-open Patent Application (tokkai) 2011-255799 proposes a lock device that can lock a seat back of a vehicle seat at a given angular position (viz., in-use position) relative to a striker fixed to a vehicle body. The lock device (or lock unit) disclosed by this publication comprises generally a base plate that has a striker receiving recess, a latch plate that has a striker latching recess and is rotatably connected to the base plate to rotate between a striker latch position and a striker unlatch position, a cam member that is rotatably connected to the base plate and functions to turn the latch plate latching the striker to a lock position and a ratchet pawl that is rotatably connected to the base plate and functions to lock the latch plate taking the lock position. That is, when the lock unit assumes a locking condition locking the striker for locking the seat back at the given angular position (or in-use position), the lock unit shows such a condition that the striker in the striker receiving recess is latched by the latch plate and at the same time the latch plate is locked at the striker latch position by the ratchet pawl. The improvement proposed by the publication is to provide a lower edge of the striker latching recess of the latch plate with an inclination. Due to provision of this inclination, when the lock unit assumes the locking condition, a rectangular locking space for the striker that is defined by both a bottom portion of the striker receiving recess and the lower edge of the striker latching recess can have a narrowed exit for the striker. With this narrowed exit, undesired disengagement of the striker from the lock unit, which would be caused at the time the vehicle collision or the like, is suppressed.

SUMMARY OF THE INVENTION

However, due to its inherent construction, the lock device disclosed by the above-mentioned publication fails to provide the users with satisfaction for the following reasons.

First, usually, the width of the striker receiving recess of the base plate is very large as compared with the diameter of the striker for making assured insertion of the striker into the striker receiving recess of the base plate at the time for locking the seat back at the given angular position, This means that the lock unit mounted on the seat back and the striker fixed to the vehicle body are allowed to show a permissible relative positioning therebetween for the assured insertion when the seat back comes to the given angular position (viz., in-use position). However, even through the permissible relative positioning is provided, if the insertion of the striker into the striker receiving recess brings about a positioning of the striker just near the narrowed exit of the rectangular locking space, the above-mentioned advantage given by the inclination of the lower edge of the striker latching recess is not expected.

Second, due to provision of the inclination to the lower edge of the striker latching recess of the latch plate, an angular position that is taken by the latch plate at the time of latching the striker between the bottom of the striker receiving recess of the base plate and the lower edge of the striker latching recess tends to be widely varied. This wide variation of the latch plate angular position causes increase in pressing distance needed by the cam member and thus increase in size of the cam member. As a result, the entire construction of the lock device, more specifically, the construction of the lock unit becomes bulky, which is not matched with modernized vehicle seats.

Accordingly, it is an object of the present invention to provide a lock device which is free of the above-mentioned drawbacks.

According to the present invention, there is provided a seat lock device for a vehicle seat, which can assuredly and smoothly bring about a locked condition of the seat in spite of its compact construction.

According to the present invention, there is provided a lock device for a vehicle seat, which can assuredly keep its locked condition even if a big shock is applied thereto.

In accordance with the present invention, there is provided a lock device for locking a seat of a vehicle relative to a striker fixed to a vehicle body, which comprises a base plate (2) having a striker receiving recess (2a) for receiving therein the striker (200); a latch plate (3) rotatably connected to the base plate (2) and having a striker catching recess (3b) for catching the striker (200), the latch plate (3) being rotatable between a latch position to cause the striker catching recess (3b) to catch the striker (200) and an unlatch position to cause the striker catching recess (3b) to release the striker (200); a lock plate (4) rotatably connected to the base plate (2) and rotatable between a lock position to cause the latch plate (3) to be locked at the latch position and an unlock position to cause the latch plate (3) to be unlocked; and a cover member (6) having a U-shaped flange (6d) formed thereon, the cover member (6) covering one major surface of the base plate (2) having the U-shaped flange (6d) neatly disposed on a peripheral edge of the striker receiving recess (2a), in which the latch plate (3) comprises a latch plate proper including upper and lower finger portions (3d, 3h) between which the striker catching recess (3b) is defined, an upper surface (3j) of the lower finger portion (3h) including a depressed main portion located near the bottom of the striker catching recess (3b), a raised leading end portion (3i) and a stepped portion (3k) provided between the depressed main portion and the raised leading end portion (3i) and a film (10) that covers the latch plate proper except the raised leading end portion (3i), the film (10) covering the depressed main portion of the upper surface (3j) in such a manner that an outer surface of the film (10) is flush with the stepped portion, the film (10) covering the depressed main portion being deformable when pressed by the striker (200).

BRIEF DESCRIPTION OF THE DRAWINGS

Other objects and advantages of the present invention will become apparent from the following description when taken in conjunction of the accompanying drawings, in which:

FIGS. 1A and 1B are plan views of a latch plate employed in a lock device of a first embodiment of the present invention, in which FIG. 1A shows a condition in which a striker just enters a striker catching recess of the latch plate and FIG. 1B shows a condition in which an advantageous lock assuring function is exhibited by the latch plate;

DETAILED DESCRIPTION OF THE INVENTION

In the following, the lock device of the present invention will be described in detail with reference to the accompanying drawings.

For ease of understanding, explanation for the lock device will be made with respect to a case in which the lock device is mounted to a pivotal seat back of a vehicle seat mounted in a motor vehicle, and for ease of description, various directional terms, such as right, left, upper, lower, rightward and the like will be used in the following description. However, such terms are to be understood with respect to only a drawing or drawings on which corresponding part or portion is shown.

Before making detailed explanation on the lock device of the present invention, the description will be directed to the vehicle seat to which the lock device is practically applied.

The vehicle seat is mounted in a motor vehicle with its front side directed forward and comprises a seat cushion that is mounted on a floor of the vehicle and a pivotal seat back that is pivotally connected at its lower part to a rear part of the seat cushion through a pivot shaft. That is, the seat back is pivotal between a front-rest position (or not in-use position) where the seat back falls down on the seat cushion and a rear-stand position (or in-use position) where the seat back stands on the seat cushion while being locked relative to a vehicle body (or the seat cushion) due to a locking work of the lock device of the present invention.

For establishing the locked condition of the seat back at the rear-stand position, one major part (viz., lock unit) of the lock device of the invention is mounted to one side portion of the seat back and the other major part (viz., striker) of the lock device is fixed a given portion of a side wall of the vehicle body. That is, as will become apparent as the description proceeds, when the seat back is raised up from the front-rest position and brought to a given angular position, the lock unit catches and thereafter locks the striker thereby to establish the locked condition of the seat back at the rear-stand position.

Now, the detail of the lock device of a first embodiment of the present invention will be described in the following with the aid of the drawings, particularly FIG. 4.

Figure 4:
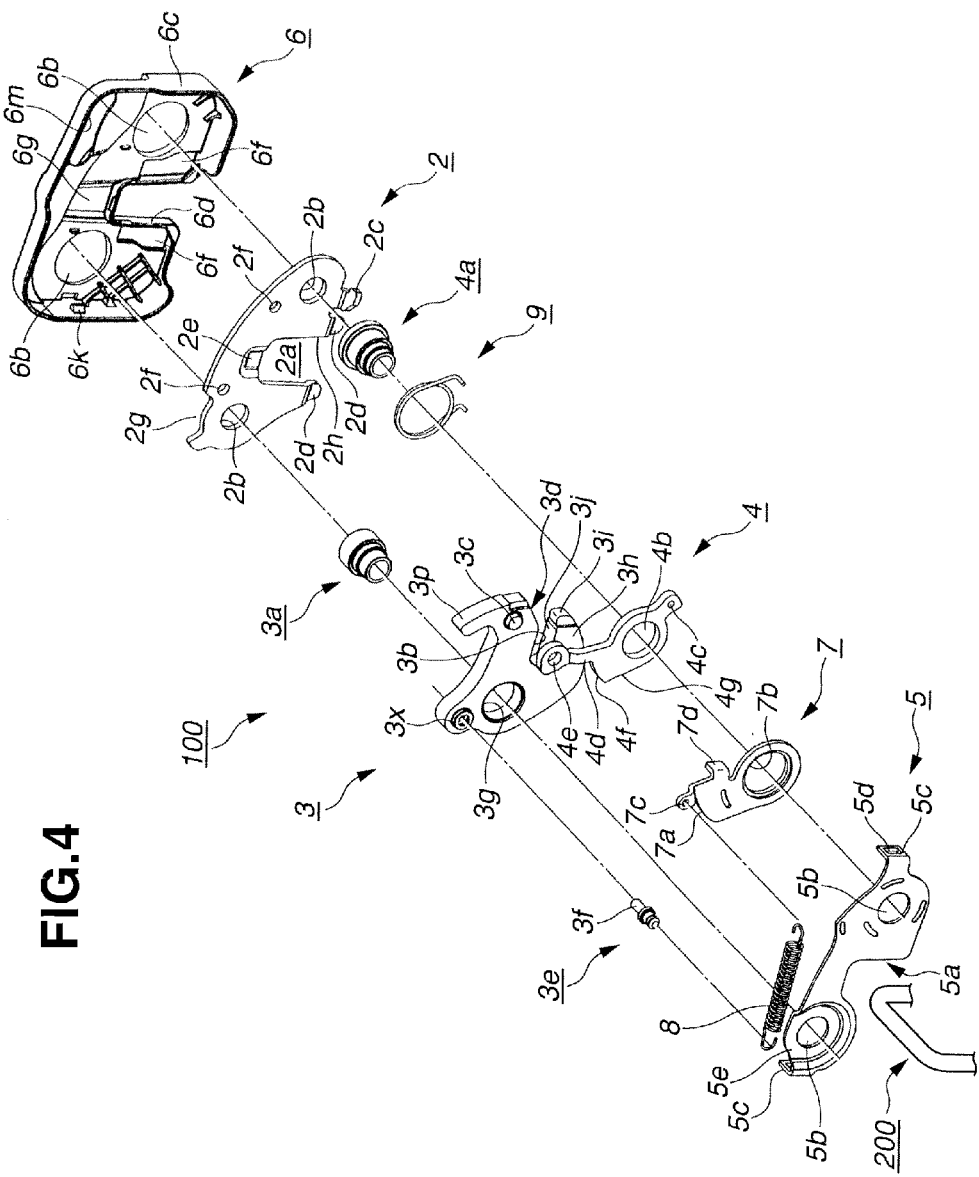
FIG. 4 is an exploded view of the lock device of the first embodiment.

Referring to FIG. 4, there is shown an exploded view of the lock device of the first embodiment of the present invention.

The lock device generally comprises two major parts which are a lock unit 100 that is mounted to the seat back of the seat and a striker 200 that is fixed to the side wall of the vehicle body, as has been mentioned hereinabove.

As is seen from FIG. 4, the lock unit 100 comprises a base plate 2 that has a striker receiving recess 2a which is rectangular in shape.

The base plate 2 is formed at both sides of the recess 2a with respective circular openings 2b and 2b for receiving therein a latch plate shaft 3a and a lock plate shaft 4a respectively. These two shafts 3a and 4a are very short in length as shown.

For the purpose which will become apparent hereinafter, the base plate 2 is formed at an upper left portion thereof with a recess 2g that has a rounded bottom wall.

Denoted by numeral 3 is a latch plate that has a circular opening 3g through which the latch plate shaft 3a passes, so that the latch plate 3 is rotatably disposed on the latch plate shaft 3a.

Denoted by numeral 4 is a lock plate 4 that has a circular opening 4b through which the lock plate shaft 4a passes, so that the lock plate 4 is rotatably disposed on the lock plate shaft 4a.

The latch plate 3 is formed with a striker catching recess 3b that is sized to receive the striker 200 and defined between upper and lower finger portions 3d and 3h of the latch plate 3.

As will be clearly described hereinafter, the lower finger portion 3h has a leading end portion 3i that is projected rightward. An upper surface of the lower finger portion 37, that defines a lower wall of the striker catching recess 3b, is denoted by numeral 3j.

The striker catching recess 3b is defined between the upper surface 3j of the lower finger portion 3h and a downwardly facing surface (no numeral) of the upper finger portion 3d.

A spring holding pin 3e is put in an opening 3x formed in an upwardly projected portion of the latch plate 3.

A right end 3f of the spring holding pin 3e, which extends rightward from the opening 3x of the latch plate 3, is slidably engaged with the rounded bottom wall of the above-mentioned recess 2g of the base plate 2. Due to this sliding engagement between the right end 3f of the pin 3e and the recess 2g, the pivoting movement of the latch plate 3 about the latch plate shaft 3a has a limited range.

Figure 5:
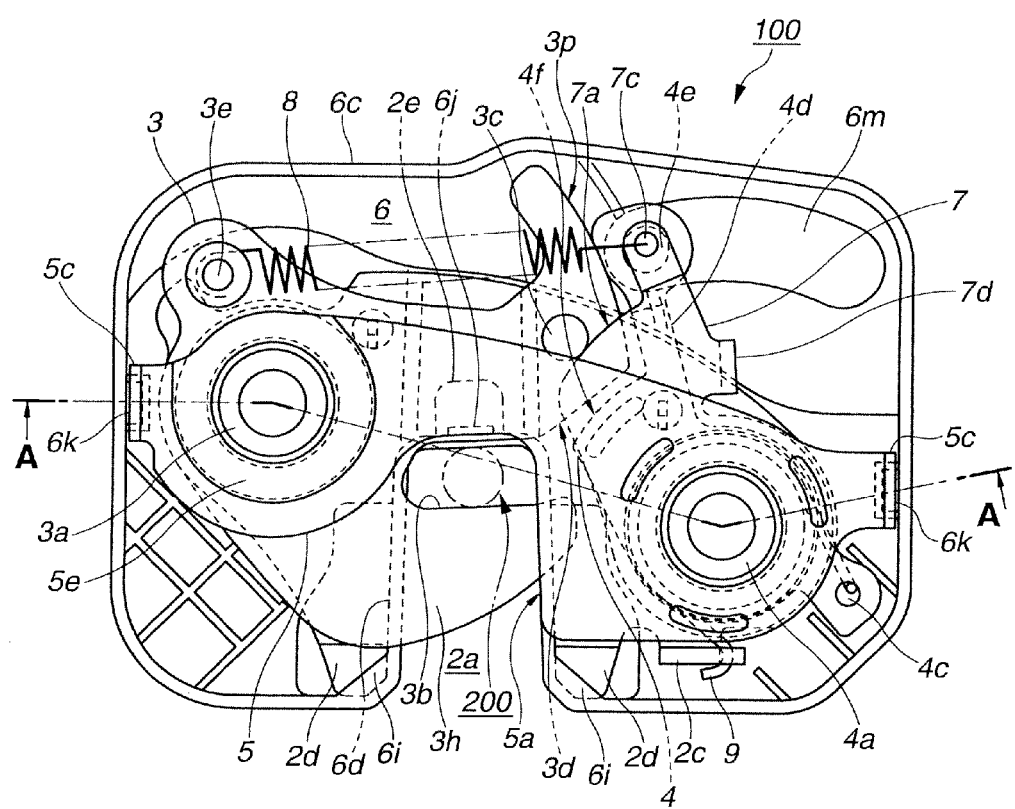
FIG. 5 is a plan view of the lock device of the first embodiment with the holding plate removed, showing the locked condition of the lock device.
Figure 9:
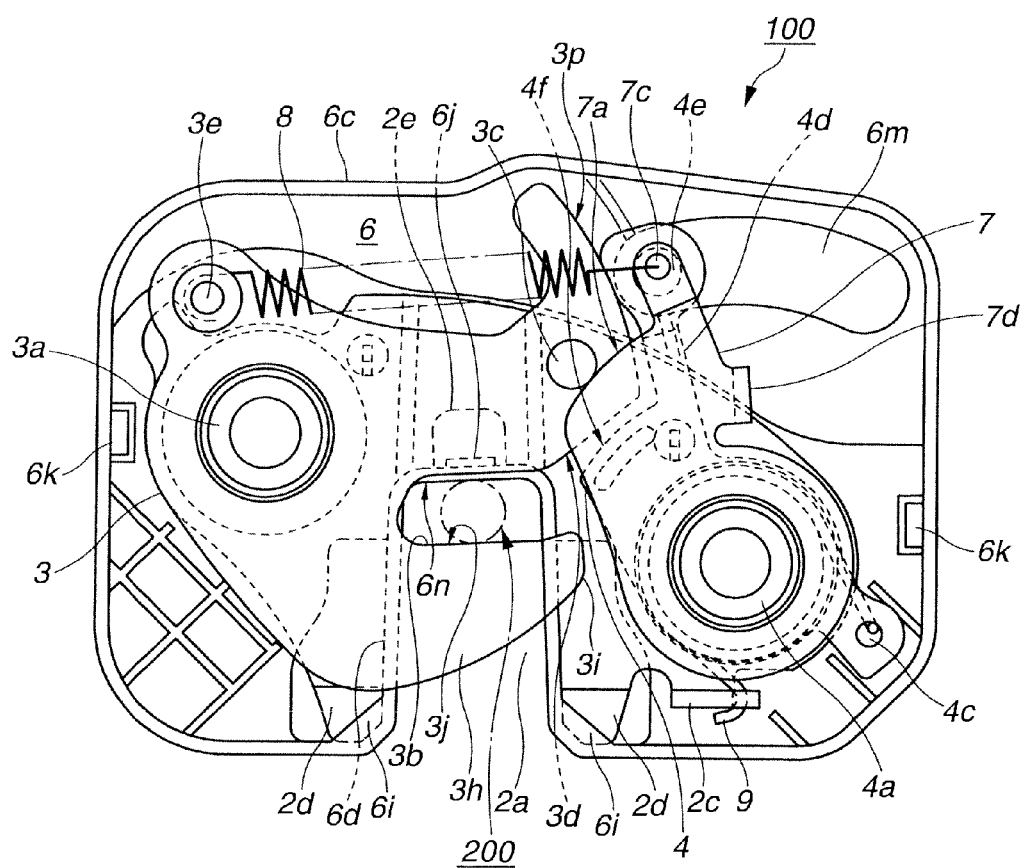
FIG. 9 is a view similar to FIG. 8, but showing the locked condition of the lock device of the first embodiment.

As will be described in detail hereinafter, when the lock unit 100 assumes a locked condition as shown in FIG. 5 or 9, the latch plate 3 takes such an angular position as to cause the striker catching recess 3b to across the striker receiving recess 2a of the base plate 2.

Figure 6:
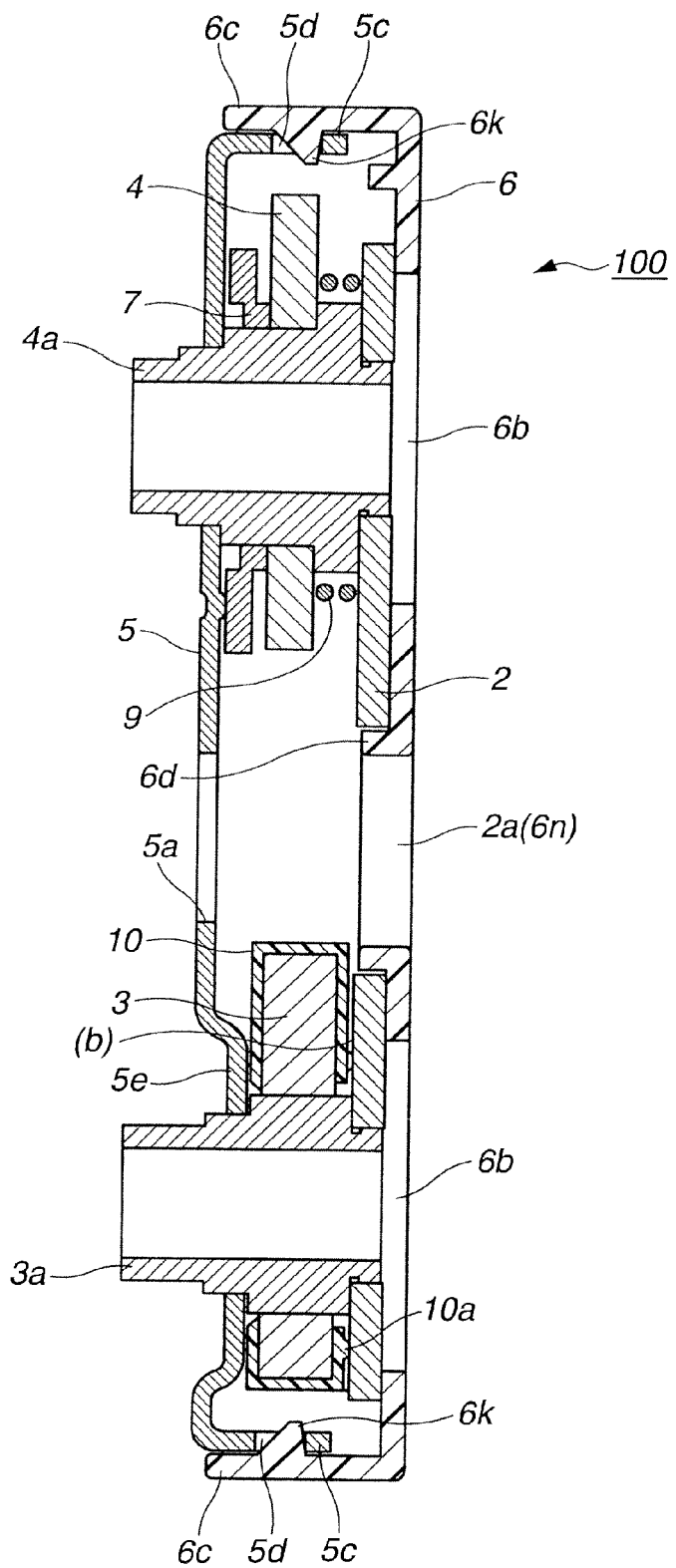
FIG. 6 is an enlarged sectional view taken along the line A-A of FIG. 5.

As is seen from FIG. 6, the latch plate 3 is entirely covered with a plastic film 10 except the leading end portion 3i of the lower finger portion 3h (see FIG. 4). If desired, in place of the plastic film 10, a rigid rubber film may be used.

Of course, an inner surface of the striker catching recess 3b of the catch plate 3 is also covered with the plastic film 10 except the leading end portion 3i.

It is preferable to use a nonrigid one as the plastic film 10. That is, a soft but durable plastic is preferable.

The detail of the striker catching recess 3b of the latch plate 3 will be described hereinafter. In fact, the construction and shape of the striker catching recess 3b take part in the concept of the present invention.

For the purpose that will be clarified hereinafter, the latch plate 3 is further provided with a pin 3c that projects leftward from the upper finger portion 3d and a curved arm 3p that projects radially outward from the upper finger portion 3d, as shown.

The lock plate 4 is formed with a rounded lock edge 4f that is used for locking the latch plate 3 when the striker 200 is sufficiently received in both the striker receiving recess 2a of the base plate 2 and the striker catching recess 3b of the latch plate 3.

Below the rounded lock edge 4f, the lock plate 4 has a back edge 4g that is used for unlocking the latch plate 3 when the curved arm 3p contacts the back edge 4g.

The rounded lock edge 4f of the lock plate 4 is concentric with the circular opening 4b of the lock plate 4. That is, in the locked condition of the latch plate 3, the rounded lock edge 4f is in contact with a jaw part of the upper finger portion 3d of the latch plate 3 (see FIG. 5 or 9).

For holding left ends of the latch and lock plate shafts 3a and 4a, there is further provided a holding plate 5 that is postured in parallel with the base plate 2.

That is, two circular openings 5b and 5b provided by the holding plate 5 receive therein the left ends of the latch and lock plate shafts 3a and 4a respectively. By caulking the left ends of the latch and lock plate shafts 3a and 4a, the left ends are secured to the holding plate 5. The opening 5b for the latch plate shaft 3a is depressed toward the base plate 2 to provide a depressed portion 5e, as shown.

Denoted by reference numeral 5a is a straight wall edge possessed by the holding plate 5, which becomes matched with a right wall edge 2h of the striker receiving recess 2a of the base plate 2 when the holding plate 5 is properly mounted to a cover member 6 in an after-mentioned manner. That is, the straight wall edge 5a of the holding plate 5 can reinforce the striker receiving recess 2a of the base plate 2.

A projection 4c is provided at a diametrically opposed portion of the rounded lock edge 4f with respect to the circular opening 4b.

Between the projection 4c of the lock plate 4 and a projection 2c of the base plate 2, there is operatively arranged an annular torsion spring 9 that biases the lock plate 4 to turn in a counterclockwise (or locking) direction to engage the rounded lock edge 4f of the lock plate 4 with the jaw part of the upper finger portion 3d of the latch plate 3. The annular torsion spring 9 is disposed around the lock plate shaft 4a at a position between the lock plate 4 and the base plate 2.

The lock plate 4 is formed with a lever portion 4d near the rounded lock edge 4f, that extends toward the upper finger portion 3d of the latch plate 3. The lever portion 4d is used for turning the lock plate 4 in a lock cancelling direction as will be described hereinbelow.

Although not shown in the drawing, to an opening 4e of the lever portion 4d, there is connected one end of an operation rod that extends from a lock-cancelling knob mounted on an exposed given area of the seat back. That is, upon manipulation of the lock-cancelling knob by an operator (or passenger in the vehicle), the operation rod is moved in a direction to pivot the lock plate 4 in the lock cancelling direction.

About the lock plate shaft 4a, there is rotatably disposed a pressing cam 7 that functions to press the latch plate 3 in the locked condition in a counterclockwise direction. For its rotation, the pressing cam 7 is formed with a circular opening 7b that receives therein the lock plate shaft 4a.

The pressing cam 7 is formed with a cam surface 7a that can be in contact with the above-mentioned pin 3c of the latch plate 3. The pressing cam 7 has near the cam surface 7a a projection 7c for catching one end of a tension spring 8. The other end of the tension spring 8 is caught by the above-mentioned spring holding pin 3e. Due to the biasing force of the tension spring 8, the latch plate 3 is biased to turn in a clockwise (or lock cancelling) direction and the pressing cam 7 is biased to turn in a counterclockwise direction.

The pressing cam 7 is further formed with a bent arm 7d that projects toward the lock plate 4. That is, when the latch plate 3 becomes unlocked due to turning the lock plate 4 in a clockwise direction, the bent arm 7d functions to turn the pressing cam 7 in a clockwise direction against the biasing force of the tension spring 8.

Figure 8:
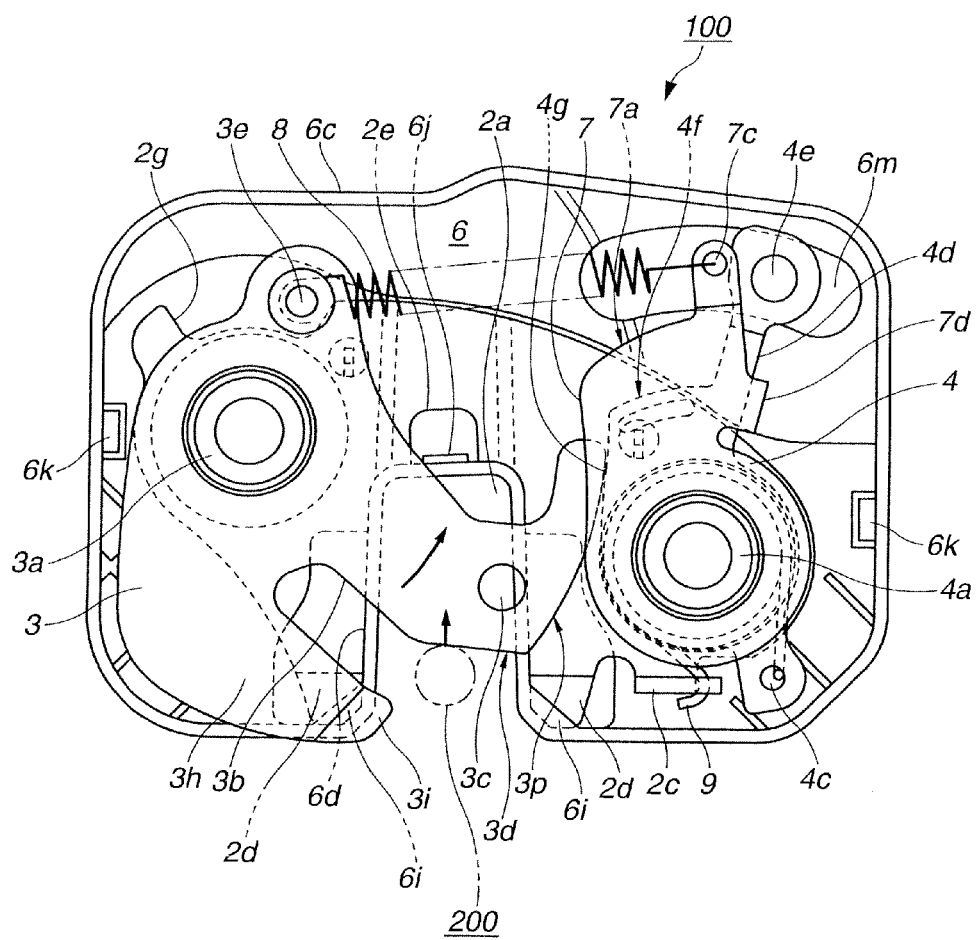
FIG. 8 is a plan view of the lock device of the first embodiment with the cover member removed, showing a condition in which the lock device is in the process of arriving at the locked condition.

The base plate 2, latch plate 3, lock plate 4, pressing cam 7 and holding plate 5 which are assembled in the above-mentioned manner constitute a thinner mechanism unit as will be understood from FIG. 8.

Referring back to FIG. 4, the thinner mechanism unit is neatly received in a cover member 6 that is made of a metal, a plastic or the like. As shown, when the mechanism unit is properly received in the cover member 6, a right major surface of the base plate 2 faces and contacts an inner side of the cover member 6.

Figure 3:
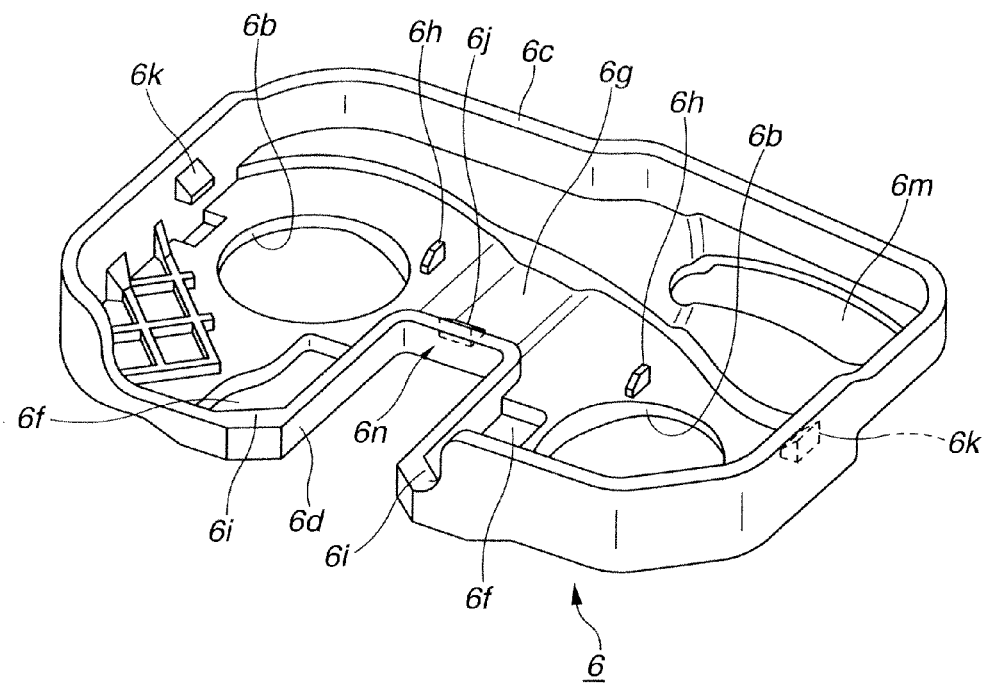
FIG. 3 is a perspective view of a cover member employed in the lock device of the first embodiment, showing the inside of the cover member.

As will be understood from FIGS. 3 and 4, the cover member 6 is formed with larger circular openings 6b and 6b for receiving right end portions of the latch and lock plate shafts 3a and 4a.

The cover member 6 is further formed with a surrounding wall 6c that extends around a periphery of the cover member 6. Furthermore, the cover member 6 is further formed with a generally U-shaped flange 6d at a portion that coincides with the striker receiving recess 2a of the base plate 2.

For the reason as will become apparent hereinafter, an axial length (or height) of the U-shaped flange 6d of the cover member 6 is so set that the U-shaped flange 6d does not project beyond the striker receiving recess 2a of the base plate 2, as is seen from FIG. 6.

As will be understood from FIG. 4, upon assembly, the U-shaped flange 6d of the cover member 6 is snugly received in the striker receiving recess 2a of the base plate 2. With this, a naked periphery of the striker receiving recess 2a is covered by the flange 6d of the plastic cover member 6. With this plastic covering, a noise that would be produced when the striker 200 hits against the wall of the striker receiving recess 2a is to suppressed or at least damped.

Referring back to FIG. 3, denoted by reference 6m is an elongate opening formed in the cover member 6, through which the above-mentioned operation rod from the lock-canceling knob passes.

The cover member 6 is detachably connected to the thinner mechanism by a fixing means which will be described in the following.

As is seen from FIG. 3, the cover member 6 is formed, at laterally opposed portions of an inner surface of the surrounding wall 6c, with respective bosses 6k and 6k each having a sloped top surface, and as is seen from FIG. 4, the holding plate 5 is formed at its lateral ends with respective brackets 5c and 5c each projecting toward the cover member 6 and having an opening 5d.

When it is intended to couple the cover member 6 and the mechanism unit, the mechanism unit is pressed against the inner side of the cover member 6 with a given force. With this pressing action, the two bosses 6k and 6k of the cover member 6 are put into the openings 5d of the brackets 5c and 5c in a snap-action manner.

For assuring the setting of the U-shaped flange 6d of the plastic cover member 6 in the striker receiving recess 2a of the base plate 2, the following setting means is further provided.

That is, the setting means comprises three pawls 2d, 2d and 2e that are formed by the base plate 2 around the striker receiving recess 2a and depressed toward the cover member 6 and three recesses 6f, 6f and 6g that are formed by the cover member 6 around the U-shaped flange 6d. As will become apparent hereinafter, in the process of accurately fitting the base plate 2 to the cover member 6, the depressed pawls 2d, 2d and 2e of the base plate 2 are put in the respective recesses 6f, 6f and 6g of the cover member 6 before making an axial movement of the base plate 2 relative to the cover member 6.

For catching the depressed pawls 2d, 2d and 2e of the base plate 2 (see FIG. 4), the recesses 6f, 6f and 6g of the cover member 6 (see FIG. 3) are formed at their front portions with small projections 6i, 6i and 6j. That is, behind the small projections 6i, 6i and 6j, there are formed or defined small pockets 6p, 6p, 6p' for tightly receiving therein the depressed pawls 2d, 2d and 2e.

Positioning means is further provided for establishing a relative positioning between the cover member 6 and the base plate 2 as will be described in the following.

Figure 7:
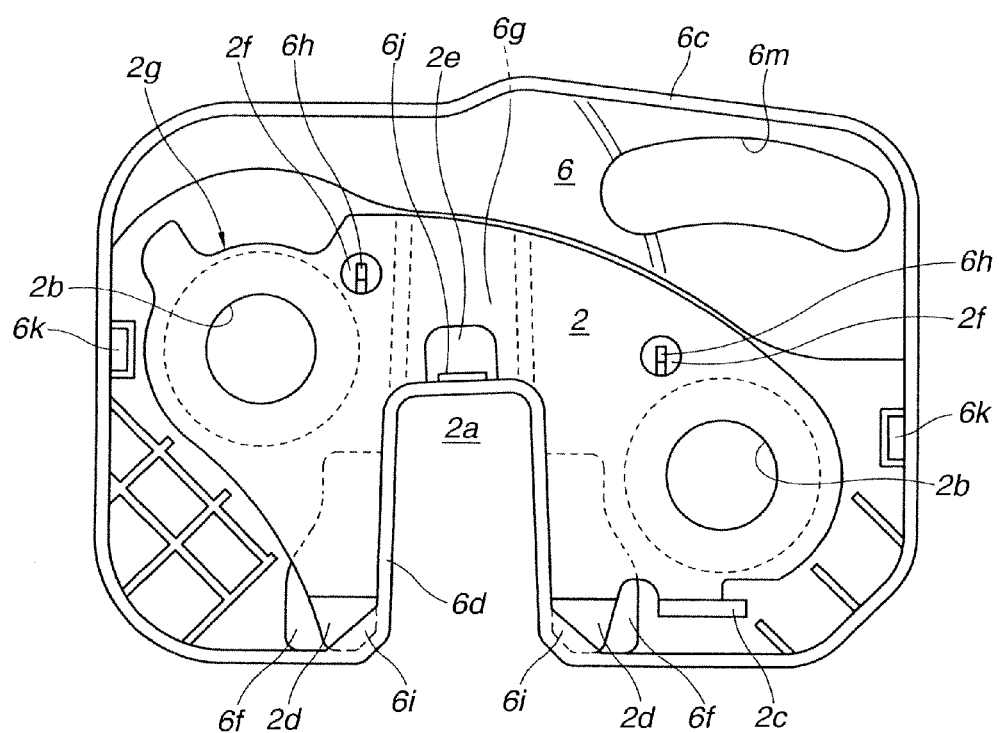
FIG. 7 is a plan view of a unit consisting of the cover member and a base plate, showing a condition in which the cover member and the base plate are correctly coupled.

As is seen from FIGS. 3, 4 and 7, the positioning means comprises two openings 2f and 2f (see FIGS. 4 and 7) that are formed in the base plate 2 at both sides of the striker receiving recess 2a, and two ribs 6h and 6h (see FIG. 3) that are formed on the inner side of the cover member 6 at positions corresponding to those of the two openings 2f and 2f. Each rib 6h has a sloped top surface. Upon coupling between the base plate 2 and the cover member 6, the two ribs 6h and 6h are put into the two openings 2f and 2f to achieve the relative positioning between the two members 2 and 6 and thus, positioning of the U-shaped flange 6d of the cover member 6 relative to the striker receiving recess 2a of the base plate 2 is established.

In the following, operation of the lock device of the present invention will be described in detail with the aid of the drawings, particularly FIGS. 8 and 9.

For ease of description, the explanation will be commenced with respect to a rest condition of the lock device.

Under this rest condition, the associated seat back assumes the front-rest position falling down on the seat cushion, and the lock unit 100 takes an unlock condition as shown in FIG. 8 wherein the latch plate 3 and the lock plate 4 assume their rest positions. Of course, the striker 200 does not appear in FIG. 8.

That is, under this rest condition, the curved arm 3p of the latch plate 3 contacts the back edge 4g of the lock plate 4 to place the lock plate 4 at a lock cancelling position. Under this, the latch plate 3 is unlocked.

When, due to raising of the seat back from its front-rest position (viz., not in-use position), the seat back comes to the given angular position (viz., in-use position), the striker receiving recess 2a of the lock unit 100 receives the striker 200, as will be understood from FIG. 8.

Thereafter, the striker 200 moves into the striker receiving recess 2a and abuts against the upper finger portion 3d of the latch plate 3 and pushes the same upward in FIG. 8 against the force of the tension spring 8. In accordance with the insertion of the striker 200 into the striker receiving recess 2a, the latch plate 3 is turned in a counterclockwise direction in FIG. 8 about the latch plate shaft 3a leaving the curved arm 3p of the latch plate 3 from the back edge 4g of the lock plate 4.

When, as will be understood from FIG. 9, the curved arm 3p of the latch plate 3 is disengaged from the back edge 4g of the lock plate 4, the lock plate 4 is allowed or forced to turn in a counterclockwise direction about the lock plate shaft 4a due to the biasing force of the annular torsion spring 9, and stopped at an angular position where the rounded lock edge 4f of the lock plate 4 abuts against the jaw part of the upper finger portion 3d of the latch plate 3. Upon this, a clockwise turning of the lock plate 3, which is induced by the biasing force of the torsion spring 8, is blocked by the lock edge 4f of the lock plate 4.

Under this condition, the latch plate 3 is locked while catching the striker 200 as will be understood from FIG. 9. In other words, the striker 200 is locked by the locked latch plate 3.

Under this locked condition of the striker 200, due to the biasing force of the tension spring 8, the pressing cam 7 is biased to turn in a counterclockwise direction causing the cam surface 7a thereof to press the pin 3c of the latch plate 3. With this, the latch plate 3 is biased to turn in a counterclockwise direction.

Accordingly, the lower finger portion 3h of the latch plate 3 is biased to turn upward in FIG. 9 pressing the striker 200 against the bottom of the striker receiving recess 2a of the base plate 2. Thus, undesired play of the striker 200 is suppressed. In other words, undesired play of the lock unit 100 relative to the striker 200 is suppressed or at least minimized.

Thus, under this condition, the seat back is locked at the given angular position by the lock device. Thus, a passenger can use the seat as a normal seat having a back rest.

When now the operator (or passenger) intends to fold up the seat back, the lock-cancelling knob on the seat back is handled by the operator. With this, the lever portion 4d of the lock plate 4 is moved rightward in FIG. 9 causing the lock plate 4 to turn in a clockwise direction. Thus, the rounded lock edge 4f of the lock plate 4 is released from the jaw part of the upper finger portion 3d of the latch plate 3 and thus the latch plate 3 is permitted to turn in a clockwise direction due to the biasing force of the torsion spring 8.

The turning of the latch plate 3 in the clockwise direction releases the striker 200 from the striker catching recess 3b of the latch plate 3 and at the same time from the striker receiving recess 2a of the base plate 2.

Under this condition, the lock unit 100 mounted on the seat back is released from the striker 200 fixed to the vehicle body, and thus, the locked condition of the seat back at the given angular position is cancelled. Thus, the standing seat back can be folded down forward upon receiving a certain handling force from the operator.

It is to be noted that when, due to manipulation of the lock-cancelling knob on the seat back, the lock plate 4 is turned in the clockwise direction in FIG. 9, the lever portion 4d of the lock plate 4 abuts against the bent arm 7d of the pressing cam 7 and thus turns the pressing cam 7 in a clockwise direction to its original position of FIG. 8.

In the following, important features of the present invention will be described in detail with the aid of FIGS. 1A and 1B, and FIGS. 10A and 10B.

Figure 1A:
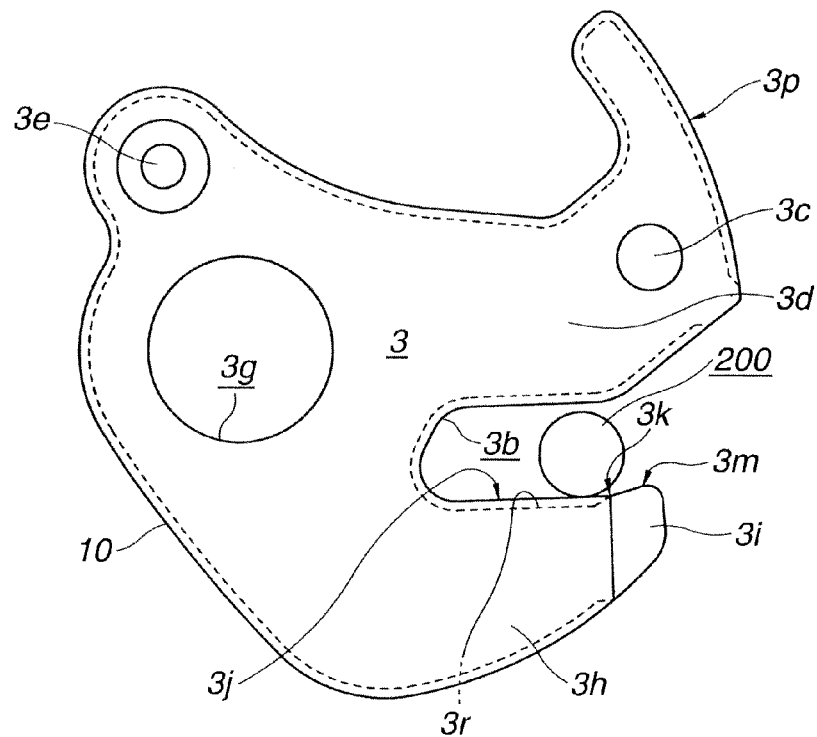
Figure 1B:
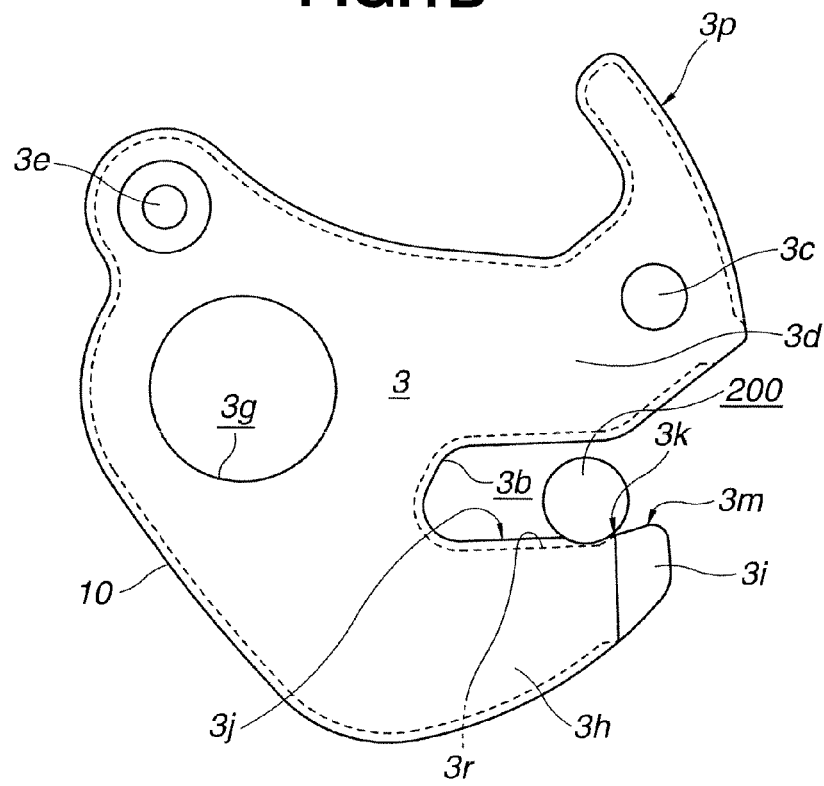

Referring to FIGS. 1A and 1B, there is shown the latch plate 3 employed in the first embodiment of the present invention.

As has been mentioned hereinabove, the latch plate 3 is entirely covered or lined with the plastic film 10 except the leading end portion 3i of the lower finger portion 3h.

As is seen from FIG. 1A, the leading end portion 3i of the lower finger portion 3h is naked and has a sloped upper surface 3m that inclines toward the upper finger portion 3d. If desired, the sloped upper surface 3m may be rounded.

As will be understood from FIG. 1A, due to provision of such sloped upper surface 3m, undesired disengagement of the striker 200 from the striker catching recess 3b is minimized. That is, the sloped upper surface 3m serves as a stopper for stopping the striker 200.

That is, the sloped upper surface 3m shows a slight given angle relative to a major part of the upper surface 3j of the lower finger portion 3h. More specifically, the sloped upper surface 3m starts at a stepped portion 3k where a shallow recess 3r provided by the lower finger portion 3h for receiving therein the plastic film 10 terminates.

As will be seen from FIG. 1A, due to presence of the plastic film 10 in the terminating portion of the shallow recess 3r, the stepped portion 3k is provided with a smoothed guide way for the striker 200. That is, the stepped portion 3k is prevented from having an undesired gap relative to the major part of the upper surface 3j of the lower finger portion 3h.

Figure 2:
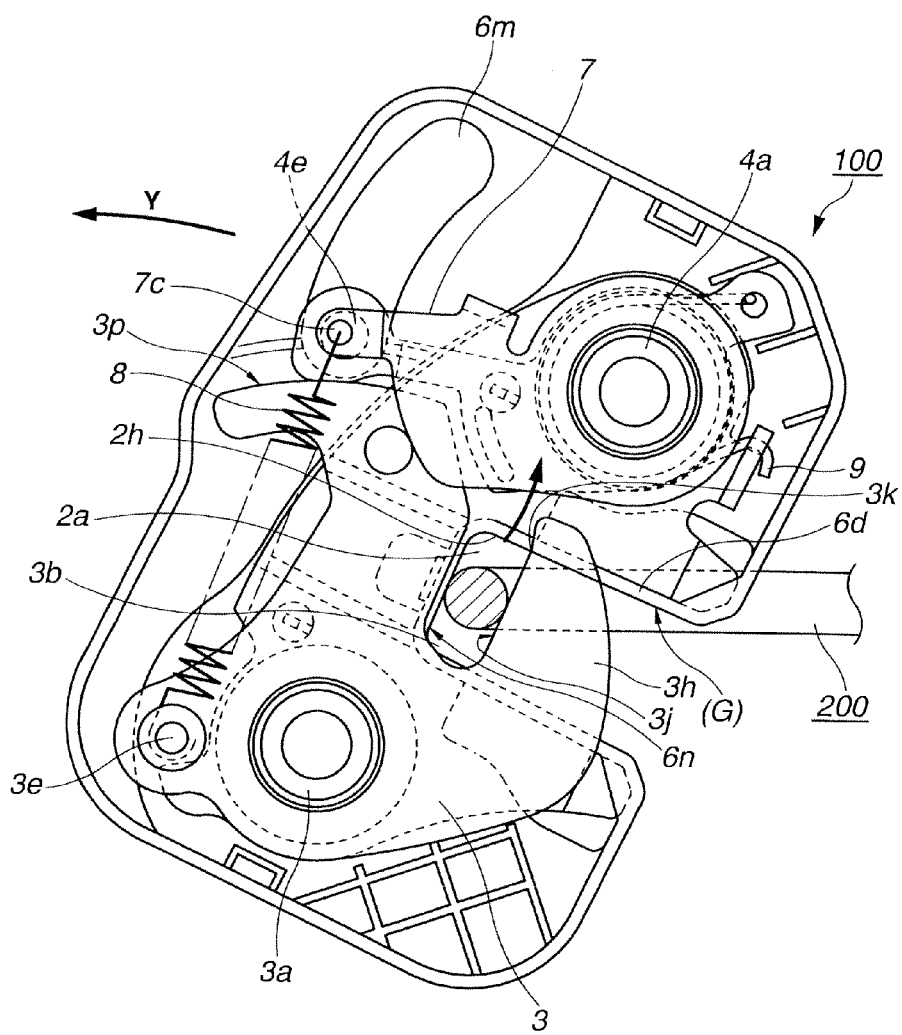
FIG. 2 is a plan view of the lock device of the first embodiment with a holding plate removed, showing a locked condition of the lock device with respect to a vehicle floor (VF) on which a vehicle seat to which the lock device is practically applied is mounted.

As is seen from FIG. 2, when the striker 200 is fully locked by the lock unit 100, the stepped portion 3k of the lower finger portion 3h of the latch plate 3 is placed at an outer surface (G) of the U-shaped flange 6d of the cover member 6.

As will be understood from FIG. 1B, when the latch plate 3 is strongly biased in a counterclockwise direction about the circular opening 3g, the striker 200 becomes sunken into the layer of the plastic film 10. Upon this, the stepped portion 3k of the latch plate 3 enhances its function to stop an undesired movement of the striker 200 toward a mouth of the striker catching recess 3b. That is, upon this, the stepped portion 3k serves as an improved stopper for stopping the undesired movement of the striker 200.

The important features of the present invention will be much clearly understood from the following description.

When the seat back is locked at the in-use stand position, the lock unit 100 and the striker 200 take their respective positions with respect to the vehicle floor "VF" as shown in FIG. 2. Under this condition, the striker 200 is locked by the locked lock unit 100.

When, due to a head-on vehicle collision or the like, a big force is suddenly applied to the seat back in the direction of the arrow "Y", the striker 200 is forced to move in an obliquely upward in FIG. 2 toward the mouth of the striker catching recess 3b.

However, as is seen from FIG. 1B, upon this, the striker 200 is sunken into the layer of the plastic film 10 provided on the upper surface 3j of the lower finger portion 3h, and thus, as has been mentioned hereinabove, the stepped portion 3k serves as an improved stopper for stopping such undesired movement of the striker 200 toward the mouth of the striker catching recess 3b. Of course, in this case, the right wall 2h of the striker receiving recess 2a of the base plate 2 is suppressed from receiving a big force. This means that the right wall 2h is not damaged even if such big force is suddenly applied to the locked seat back. In other words, even if such big force is applied to the locked seat back due to a head-on vehicle collision of the like, the locked condition of the seat back can be assuredly held.

In a normal locked condition, the striker 200 is not sunken into the layer of the plastic film 10 as is seen from FIG. 1A. Accordingly, the stepped portion 3k is provided with the smoothed guide way for the striker 200, and thus, at the time of unlocking the seat back, the striker catching recess 3b of the latch plate 3 can smoothly release the striker 200.

With provision of the sloped upper surface 3m, the size of the leading end portion 3i of the latch plate 3 increases. This means that the leading end portion 3i can have a robust structure. Furthermore, due to provision of the sloped upper surface 3m, the load applied to the base plate 2 can be reduced as compared with the load applied to the latch plate 3 from the striker 200. This fact prevents the base plate 2 from being damaged upon application of a big force to the lock device, and thus prevents the lock unit 100 from being released from its locked condition unwillingly.

The stepped portion 3k is so positioned that when the striker 200 is fully locked by the lock unit 100, the stepped portion 3k is placed at the outer surface (G) of the U-shaped flange 6d of the cover member 6. Thus, under the locked condition, the upper surface 3j of the lower finger portion 3h of the latch plate 3 and a bridge part 6e of the U-shaped flange 6d of the cover member 6 can be arranged in parallel with each other. This means that the locked condition of the striker 200 can be provided by placing the striker 200 in a limited position of the striker receiving recess 2a of the base plate 2.

Figure 10A:
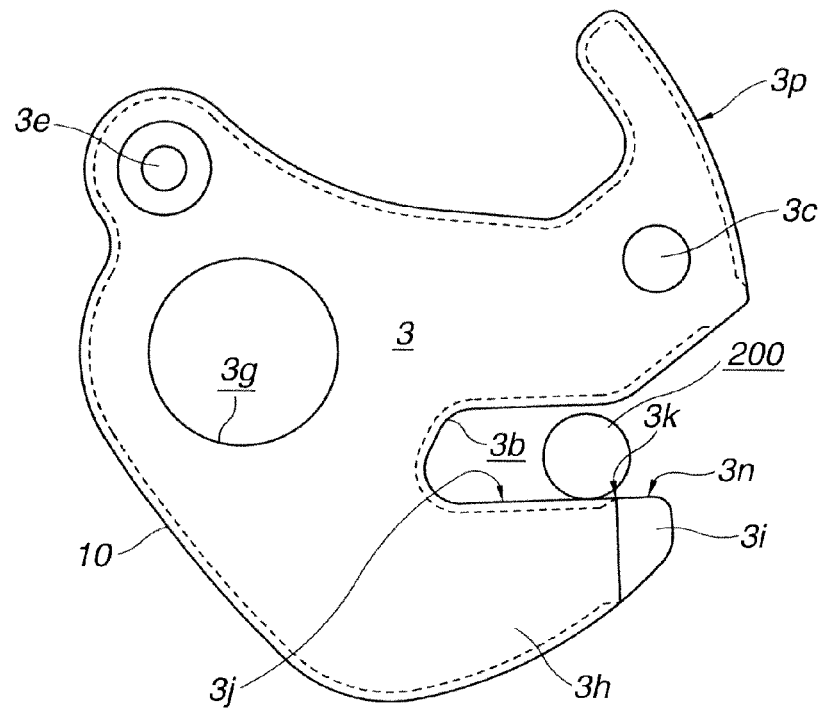
FIGS. 10A and 10B are views similar to those of FIGS. 1A and 1B, but showing a latch plate employed in a lock device of a second embodiment of the present invention.
Figure 10B:
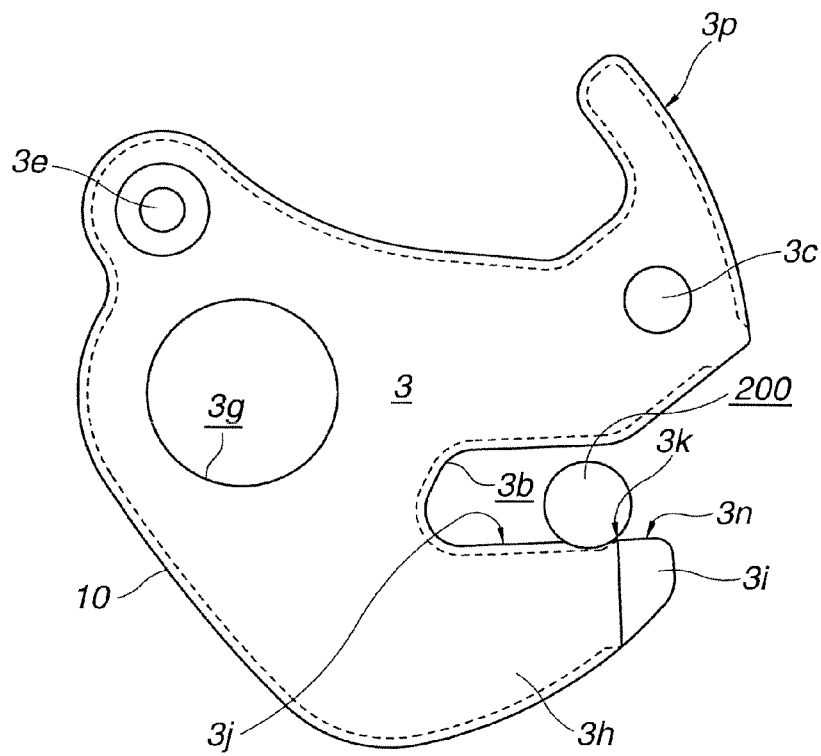

Referring to FIGS. 10A and 10B, there is shown a latch plate 3 that is employed in a lock device of a second embodiment of the present invention.

In this second embodiment, the leading end portion 3i of the lower finger portion 3h has a flat upper surface 3n in place of the above-mentioned sloped upper surface 3m employed in the first embodiment. The flat upper surface 3n is flush with the upper surface 3j of the lower finger portion 3h.

As will be easily understood from FIGS. 10A and 10B, upon application of a big force to the lock device of this second embodiment, the striker 200 is sunken in the layer of the plastic film 10 provided on the upper ridge of the lower finger portion 3h.

Thus, like in the first embodiment, the stepped portion 3k serves as the improved stopper for stopping the undesired movement of the striker 200 toward the mouth of the striker catching recess 3b. Of course, also in this case, the right wall 2h (see FIG. 2) of the striker receiving recess 2a of the base plate 2 is suppressed from receiving a big force. Thus, the locked condition of the seat back can be assuredly held.

In the above, the description is directed to a lock device that is arranged to lock a pivotal seat back to a striker fixed to a vehicle body. However, if desired, the lock device can be used for locking a pivotal seat cushion to a striker fixed to a vehicle body.

The entire contents of Japanese Patent Application 2012-101977 filed Apr. 27, 2012 are incorporated herein by reference.

Although the invention has been described above with reference to the embodiment of the invention, the invention is not limited to such embodiment as described above. Various modifications and variations of the embodiment may be carried out by those skilled in the art, in light of the above description.

What is claimed is:

1. A lock device for locking a seat of a vehicle relative to a striker fixed to a vehicle body, comprising:
   a base plate having a striker receiving recess for receiving therein the striker;
   a latch plate rotatably connected to the base plate and having a striker catching recess for catching the striker, the latch plate being rotatable between a latch position to cause the striker catching recess to catch the striker and an unlatch position to cause the striker catching recess to release the striker;
   a lock plate rotatably connected to the base plate and rotatable between a lock position to lock the latch plate at the latch position and an unlock position to unlock the latch plate; and
   a cover member having a U-shaped flange formed thereon, the cover member covering one major surface of the base plate having the U-shaped flange thereof disposed on a peripheral edge of the striker receiving recess, in which the latch plate comprises:

a latch plate proper including upper and lower finger portions between which the striker catching recess is defined, an upper surface of the lower finger portion including a depressed main portion located near the bottom of the striker catching recess, a raised leading end portion and a stepped portion provided between the depressed main portion and the raised leading end portion; and a soft film that covers the latch plate proper except the raised leading end portion, the soft film covering the depressed main portion of the upper surface of the lower finger portion in such a manner that an outer surface of the soft film is flush with the stepped portion, the soft film covering the depressed main portion being deformed when pressed by the striker in the latch position, and in which when the lock device locks the seat having the latch plate locked by the lock plate with the aid of the striker, the stepped portion of the latch plate is brought into a position that is proximate with an outer surface of the U-shaped flange of the cover member, and, at the same time, the upper surface of the lower finger portion of the latch plate and a bridge part of the U-shaped flange become parallel to each other.

2. A lock device as claimed in claim 1, in which when the film on the depressed main portion is depressed by the striker, the stepped portion enhances a function to stop a movement of the striker toward a mouth of the striker catching recess.

3. A lock device as claimed in claim 2, in which the raised leading end portion has a sloped upper surface that inclines toward the upper finger portion.

4. A lock device as claimed in claim 3, in which the sloped upper surface inclines by a given angle relative to the depressed main portion of the upper surface of the lower finger portion.

5. A lock device as claimed in claim 4, in which the sloped upper surface is rounded.

6. A lock device as claimed in claim 1, in which the stepped portion is a portion where a shallow recess provided by the depressed main portion of the upper surface terminates.

7. A lock device as claimed in claim 1, in which when the striker is latched and locked by the locked latch plate, the stepped portion is placed in-line with an outer surface of the U-shaped flange of the cover member.

8. A lock device as claimed in claim 1, in which the seat is a seat back that is pivotally connected to a seat cushion mounted on a floor of the vehicle.

9. A lock device as claimed in claim 1, in which the seat is a seat cushion that is pivotally mounted on a floor of the vehicle.

* * * * *